United States Patent
Choi

(10) Patent No.: US 10,933,871 B2
(45) Date of Patent: Mar. 2, 2021

(54) ADAPTIVE CRUISE CONTROL SYSTEM AND METHOD BASED ON PERIPHERAL SITUATIONS OF VEHICLE

(71) Applicant: MANDO CORPORATION, Pyeongtaek-si (KR)

(72) Inventor: Jae Bum Choi, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 16/280,141

(22) Filed: Feb. 20, 2019

(65) Prior Publication Data

US 2019/0263403 A1    Aug. 29, 2019

(30) Foreign Application Priority Data

Feb. 27, 2018 (KR) .................. 10-2018-0023801

(51) Int. Cl.
*B60W 30/14* (2006.01)
*B60W 30/16* (2020.01)
*G08G 1/16* (2006.01)

(52) U.S. Cl.
CPC .......... *B60W 30/146* (2013.01); *B60W 30/14* (2013.01); *B60W 30/143* (2013.01); *B60W 30/16* (2013.01); *B60W 30/162* (2013.01); *G08G 1/167* (2013.01);
(Continued)

(58) Field of Classification Search
CPC .. B60W 30/146; B60W 30/143; B60W 30/14; B60W 30/162; B60W 2720/106; B60W 2720/10; B60W 30/16; B60W 2554/804; B60W 2554/801; G08G 1/167
See application file for complete search history.

(56) References Cited

U.S. PATENT DOCUMENTS 6,304,811 B1 * 10/2001 Prestl .................... B60W 30/16 701/301
9,272,711 B1 * 3/2016 Sivaraman ............ B60W 30/16
(Continued)

FOREIGN PATENT DOCUMENTS

JP    2006-48494 A    2/2006
JP    2009-214838 A    9/2009
(Continued)

OTHER PUBLICATIONS

Office Action issued in corresponding Korean Application No. 10-2018-0023801, dated Jun. 4, 2019.
(Continued)

*Primary Examiner* — Dale W Hilgendorf
(74) *Attorney, Agent, or Firm* — Morgan, Lewis & Bockius LLP

(57) ABSTRACT

An adaptive cruise control (ACC) system and method based on peripheral situations of a vehicle are disclosed. The ACC system includes a peripheral environment detection sensor configured to detect a peripheral environment or situation of a host vehicle during an ACC process of the host vehicle, and an electronic control unit (ECU) configured to autonomously perform acceleration or deceleration control of the host vehicle according to an ACC target acceleration/deceleration amount suitable for the peripheral environment or situation detected by the peripheral environment detection sensor.

12 Claims, 4 Drawing Sheets

(52) U.S. Cl.
CPC . *B60W 2554/801* (2020.02); *B60W 2554/804* (2020.02); *B60W 2720/10* (2013.01); *B60W 2720/106* (2013.01)

(56) References Cited

U.S. PATENT DOCUMENTS

| | | | |
|---|---|---|---|
| 2003/0045991 A1* | 3/2003 | Isogai et al. | B60W 2554/804 701/301 |
| 2012/0123660 A1* | 5/2012 | Kagawa et al. | B60W 30/16 701/96 |
| 2012/0277982 A1* | 11/2012 | Weaver | B60W 2554/801 701/112 |
| 2016/0176402 A1* | 6/2016 | Andersson et al. | B60W 30/16 701/96 |
| 2016/0304097 A1* | 10/2016 | Taira et al. | B60W 2554/804 |
| 2018/0130346 A1* | 5/2018 | Orris et al. | G08G 1/167 |
| 2019/0143971 A1* | 5/2019 | Makled et al. | B60W 30/16 701/96 |

FOREIGN PATENT DOCUMENTS

| | | |
|---|---|---|
| JP | 2011-20510 A | 2/2011 |
| JP | 2016-88133 A | 5/2016 |

OTHER PUBLICATIONS

Office Action issued in corresponding Korean Application No. 10-2018-0023801, dated Aug. 26, 2019.

* cited by examiner

[FIG. 1]
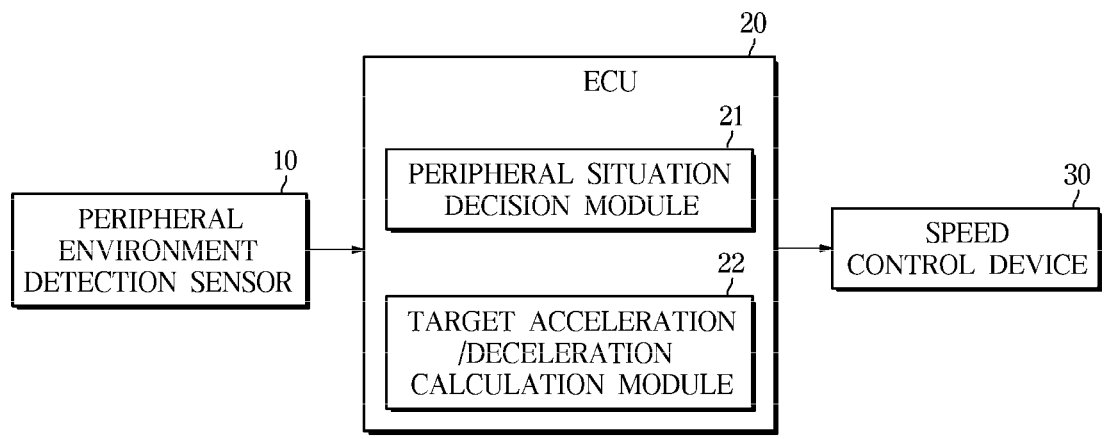

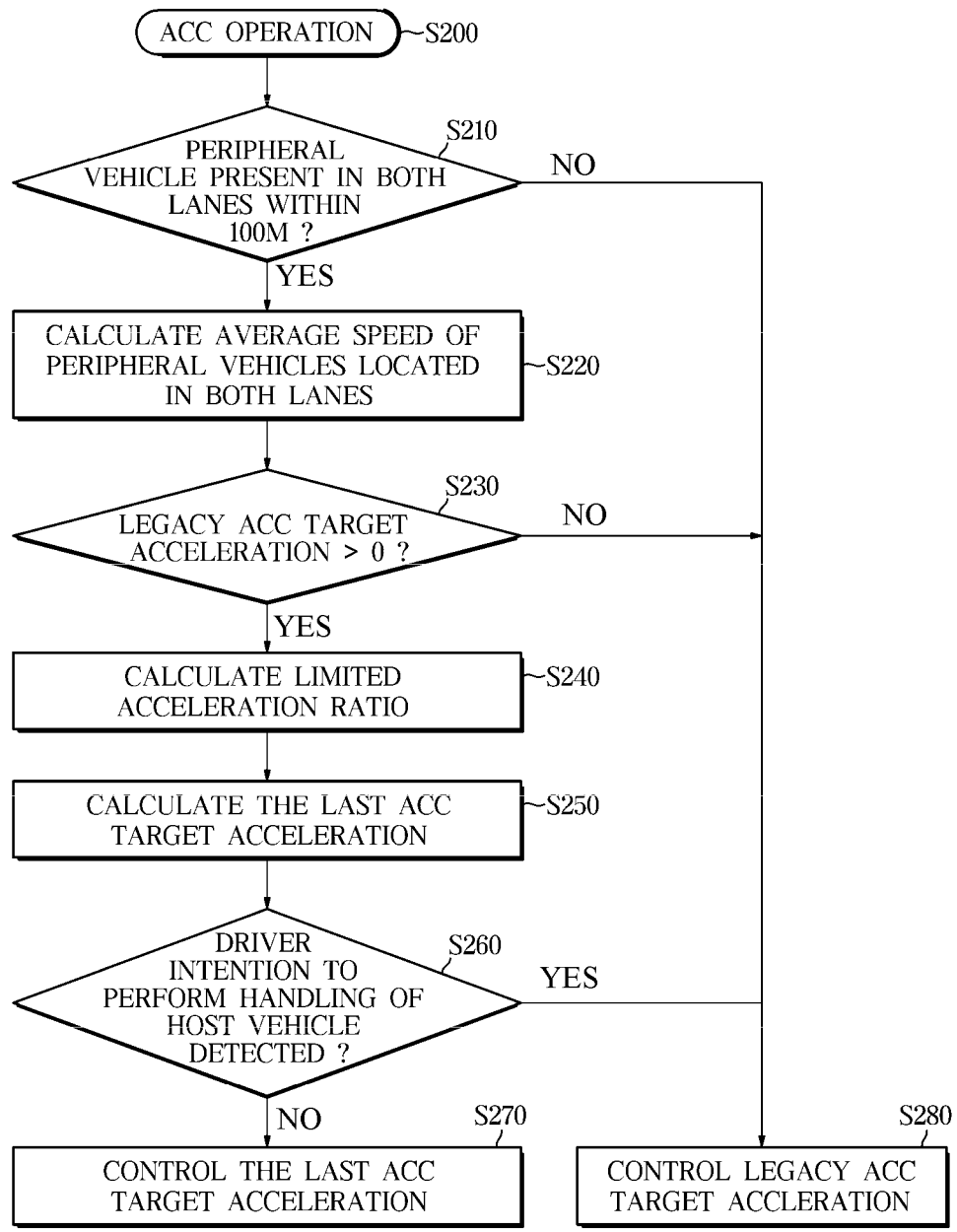

[FIG. 3A]
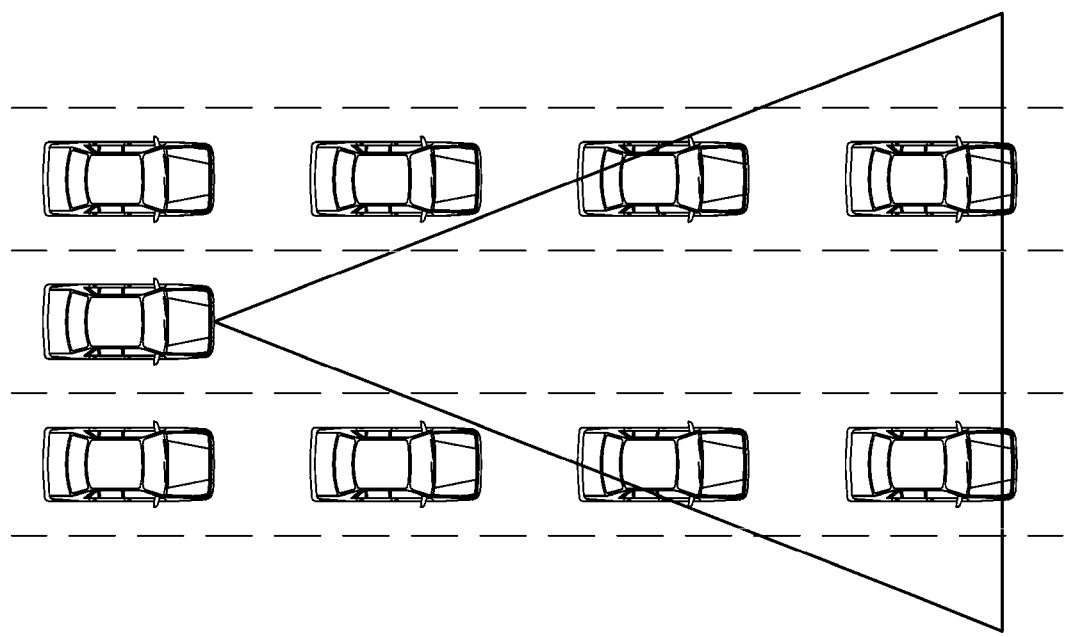

[FIG. 3B]
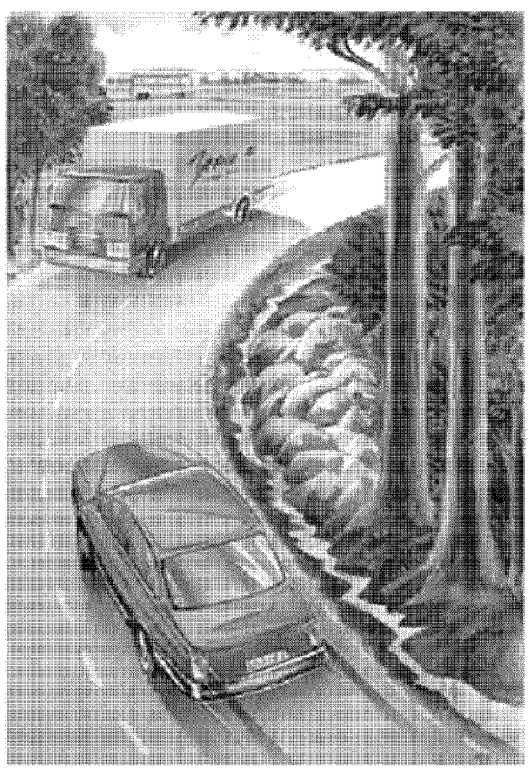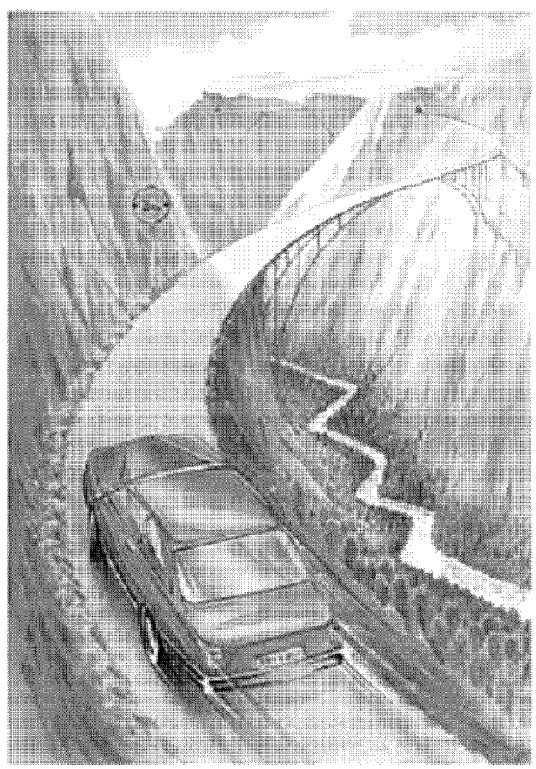

ADAPTIVE CRUISE CONTROL SYSTEM AND METHOD BASED ON PERIPHERAL SITUATIONS OF VEHICLE

CROSS-REFERENCE TO RELATED APPLICATION

This application is based on and claims priority under 35 U.S.C. § 119 to Korean Patent Application No. 10-2018-0023801, filed on Feb. 27, 2018 in the Korean Intellectual Property Office, the disclosure of which is incorporated by reference in its entirety.

BACKGROUND

1. Field

Embodiments of the present disclosure relate to an adaptive cruise control (ACC) system and method based on peripheral situations of a vehicle, and more particularly to an adaptive cruise control (ACC) system and method based on peripheral situations of a vehicle, which control ACC target acceleration by recognizing an average speed in at least one peripheral lane, and thus improve driving stability of the vehicle by preventing unnecessary acceleration of the vehicle.

2. Description of the Related Art

Generally, an Adaptive Cruise Control (ACC) system may determine a preceding vehicle to be a control object using vehicle detection information sensed by one or more embedded sensors, and may autonomously control a driving speed of a host vehicle and a distance between the host vehicle and a peripheral vehicle through acceleration/deceleration control, such that the ACC system can greatly mitigate driver difficulty during vehicle driving.

However, if a control object is not present in a traveling lane of the host vehicle although peripheral streets of the host vehicle are crowded with many vehicles as shown in FIG. 3A, the conventional ACC system accelerates the host vehicle, resulting in reduction in driving safety and stability of the host vehicle.

SUMMARY

Therefore, it is an aspect of the present disclosure to provide an adaptive cruise control (ACC) system and method based on peripheral situations of a vehicle, and more particularly to an ACC system and method based on peripheral situations of a vehicle, which control ACC target acceleration by recognizing an average speed in at least one peripheral lane, and thus improve driving stability of the vehicle by preventing unnecessary acceleration of the vehicle.

Additional aspects of the invention will be set forth in part in the description which follows and, in part, will be obvious from the description, or may be learned by practice of the invention.

In accordance with an aspect of the present disclosure, an adaptive cruise control (ACC) system includes a peripheral environment detection sensor configured to detect a peripheral environment or situation of a host vehicle during an adaptive cruise control (ACC) process of the host vehicle, and an electronic control unit (ECU) configured to autonomously perform acceleration or deceleration control of the host vehicle according to an adaptive cruise control (ACC) target acceleration/deceleration amount suitable for the peripheral environment or situation detected by the peripheral environment detection sensor.

The peripheral environment or situation may be traffic flow in peripheral lanes of the host vehicle.

The electronic control unit (ECU) may include a peripheral situation decision module configured to determine a peripheral situation detected by the peripheral environment detection sensor, and a target acceleration/deceleration calculation module configured to calculate an ACC target acceleration/deceleration amount suitable for the determined peripheral situation.

If one or more peripheral vehicles present in both lanes with respect to a lane of the host vehicle within a predetermined distance in forward and backward directions of the host vehicle are detected, the peripheral situation decision module may calculate an average speed of the detected peripheral vehicles present in both lanes with respect to a lane of the host vehicle within a predetermined distance in forward and backward directions of the host vehicle.

The target acceleration/deceleration calculation module may be configured to, if a legacy ACC target acceleration is higher than zero "0", calculate a limited acceleration ratio by multiplying the average speed of the peripheral vehicles by a weight, calculate a last ACC target acceleration by multiplying the calculated limited acceleration ratio by the legacy ACC target acceleration, and perform an ACC process according to the calculated target ACC target acceleration.

The target acceleration/deceleration calculation module is configured to, if the average speed of the peripheral vehicles is equal to or less than a legacy ACC target acceleration by a predetermined speed, calculate a last ACC target speed by limiting an ACC target speed to a sum of the average speed of the peripheral vehicles and the predetermined speed, and perform an ACC process according to the calculated ACC target speed.

If only one lane from among peripheral lanes of the host vehicle is made available, the peripheral situation decision module may calculate an average speed of peripheral vehicles located in the available lane.

If one or more peripheral vehicles present in both lanes with respect to a lane of the host vehicle within a predetermined distance in forward and backward directions of the host vehicle are not detected, if the legacy ACC target acceleration is not higher than zero "0", or if driver intention to perform handling of the host vehicle is detected, the electronic control unit (ECU) may perform the ACC process according to the legacy ACC target acceleration.

BRIEF DESCRIPTION OF THE DRAWINGS

These and/or other aspects of the invention will become apparent and more readily appreciated from the following description of the embodiments, taken in conjunction with the accompanying drawings of which:

FIG. 1 is a block diagram illustrating an Adaptive Cruise Control (ACC) system capable of being autonomously controlled based on a target acceleration/deceleration amount suitable for peripheral situations according to an embodiment of the present disclosure.

FIG. 2 is a flowchart illustrating an overall process of a method for autonomously controlling a vehicle based on a target acceleration/deceleration amount suitable for peripheral situations according to an embodiment of the present disclosure.

FIG. 3A is a conceptual diagram illustrating peripheral traffic situations to which the concept of the present disclosure can be applied, and FIG. 3B shows exemplary pictures illustrating driving environments to which the concept of the present disclosure can be applied.

DETAILED DESCRIPTION

Advantages and features of the present disclosure and a method of achieving the advantages and features of the present disclosure will be clearly understood from embodiments described hereinafter in conjunction with the accompanying drawings. However, the present disclosure is not limited to the following embodiments and may be realized in various different forms. These embodiments are provided only to completely disclose the present disclosure and for a person having ordinary skill in the art to which the present disclosure pertains to completely understand the category of the disclosure. That is, the present disclosure is defined only by the claims. The same reference numbers will be used throughout this specification to refer to the same parts.

An adaptive cruise control (ACC) system and method based on peripheral situations of a vehicle according to an embodiment of the present disclosure will hereinafter be described with reference to the attached drawings.

FIG. 1 is a block diagram illustrating an Adaptive Cruise Control (ACC) system capable of being autonomously controlled based on a target acceleration/deceleration amount suitable for peripheral situations according to an embodiment of the present disclosure.

Referring to FIG. 1, the ACC system to which an autonomous control method for autonomously controlling a vehicle with a target acceleration/deceleration amount suitable for peripheral situations of the vehicle according to an embodiment of the present disclosure may include a peripheral environment detection sensor 10, an electronic control unit (ECU) 20, and a speed control device 30.

The peripheral environment detection sensor 10 may be implemented as any of various well-known sensors, such as a radar sensor, a Light Detection And Ranging (LiDAR) sensor, etc. The peripheral environment detection sensor 10 may include a plurality of sensors. The sensors may be respectively installed at a center part of a front surface, a center part of a rear surface, and a corner part of a host vehicle, may emit electromagnetic waves within the range of a predetermined angle with respect to a forward region of each sensor, may receive electromagnetic waves reflected from peripheral objects located in the vicinity of the host vehicle, and may detect an angle, a distance, a relative speed, a relative acceleration, etc. between the host vehicle and each peripheral object, such that the sensors of the peripheral environment detection sensor 10 may transmit the detected information to the ECU 20.

The peripheral environment detection sensor 10 may be implemented as any of various well-known image sensors, for example, a Far Infrared Ray (FIR) camera, a CMOS camera (or a CCD camera), etc. The peripheral environment detection sensor 10 may be arranged at an upper end of a windshield of a host vehicle, may sense and project various kinds of light, for example, infrared light, visible light, etc., within the range of a predefined angle and a predefined distance with respect to a forward region of the camera, may acquire an image of an external object located adjacent to the host vehicle, and may transmit the acquired image to the ECU 20.

The ECU 20 of the vehicle may include a memory (e.g., DB) such as a Read Only Memory (ROM) or Random Access Memory (RAM), may store various control data such as an autonomous control program based on a target acceleration/deceleration amount suitable for peripheral situations shown in FIG. 2, and may further include a processor such as a CPU, such that the ECU 20 may perform various control programs. The ECU 20 may include a peripheral situation decision module 21 and a target acceleration/deceleration calculation module 22. The ECU 20 may receive detection signals from the peripheral environment detection sensor 10, may determine peripheral situations (see FIG. 3A) such as traffic flow (e.g., average speed, etc.) in peripheral lanes detected by the sensor or peripheral environments (e.g., a traveling lane adjacent to a sloping road, a curvature radius of the traveling lane, the number of return lanes, the width of the traveling lane, etc.) (see FIG. 3B) using the received detection signals, may calculate an ACC target acceleration/deceleration amount (e.g., a target acceleration, a target acceleration slope, or a target speed) suitable for the peripheral situations or peripheral environments, and may autonomously perform acceleration or deceleration control of the vehicle according to the target acceleration/deceleration amount.

The speed control device 30 may receive a control signal from the ECU 20, such that the speed control device 30 may perform acceleration or deceleration control of the vehicle.

The present disclosure may provide a method for autonomously performing acceleration or deceleration control of the vehicle according to an ACC target acceleration/deceleration amount suitable for peripheral situations or peripheral environments detected by the peripheral environment detection sensor 10.

An autonomous control method for autonomously controlling the vehicle with a target acceleration/deceleration amount suitable for peripheral situations using the above-mentioned system will hereinafter be described with reference to FIG. 2.

FIG. 2 is a flowchart illustrating an overall process of a method for autonomously controlling a vehicle based on a target acceleration/deceleration amount suitable for peripheral situations according to an embodiment of the present disclosure.

Referring to FIG. 2, during adaptive cruise control (ACC) of the host vehicle (S200), the ECU 20 may determine whether a peripheral vehicle is present in both lanes with respect to a lane of the host vehicle within a predetermined distance (km) in forward and backward directions of the host vehicle using the peripheral environment detection sensor 10 (S210).

If the peripheral vehicle is present in both lanes with respect to a lane of the host vehicle (YES in S210), the ECU 20 may receive detection signals from the peripheral environment detection sensor 10, may calculate an average speed of peripheral vehicles that are present in a predetermined number of lanes located at both sides of the host vehicle within a predetermined distance in forward and backward directions of the host vehicle, and may determine peripheral situations based on the calculated average speed of the peripheral vehicles (S220).

In this case, when only one lane from among peripheral lanes of the host vehicle is made available, the ECU 20 may determine an average speed of the peripheral vehicles located in the corresponding available lane. If the host vehicle is traveling in a first lane from among multiple lanes, the ECU 20 may calculate an average speed of the peripheral vehicles traveling in the same directions as the host vehicle, and may determine peripheral situations based on the calculated average speed of the peripheral vehicles.

The ECU 20 may determine whether the calculated target acceleration calculated in the legacy ACC (S200) is higher than zero "0" (S230).

If the target acceleration calculated in the legacy ACC (S200) is higher than zero "0" (YES in S230), the ECU 20 may multiply average speed of each peripheral vehicle by "K" (indicating a weight to be used when an average speed of peripheral vehicles is reflected in the last ACC target acceleration), such that the ECU 20 may calculate a limited acceleration ratio (S240). That is, as the average speed calculated in step S220 gradually decreases, the ACC acceleration limited amount gradually increases.

If the target acceleration calculated in the legacy ACC (S200) is higher than zero "0" (S230), the ECU 20 may multiply average speed of each peripheral vehicle by "K" (indicating a weight to be used when an average speed of peripheral vehicles is reflected in the last ACC target acceleration), such that the ECU 20 may calculate a limited acceleration ratio (S240). That is, as the average speed calculated in step S220 gradually decreases, the ACC acceleration limited amount gradually increases.

Finally, the ECU 20 may multiply the limited acceleration ratio calculated in step S240 by the legacy target acceleration confirmed in step S230, such that the ECU 20 may calculate the last ACC target acceleration (S250). Alternatively, If the average speed calculated in step S220 is equal to or less than a predetermined speed by the legacy ACC target acceleration confirmed in step S230, the ECU 20 may limit the acceleration ratio to the sum of the average speed and the predetermined speed, and may thus calculate the last ACC target speed using the limited acceleration ratio (S250).

If the driver has no intention to drive the host vehicle (i.e., if the driver does not manipulate a steering wheel, an accelerator pedal, or a brake pedal) (NO in S260), the ECU 20 may perform adaptive cruise control (ACC) of the host vehicle according to the last ACC target acceleration or the last ACC target speed (S270).

However, if no peripheral vehicle is present in both lanes with respect to a lane of the host vehicle within a predetermined distance in forward and backward directions of the host vehicle (NO in S210), if the legacy ACC target acceleration is not higher than zero "0" (NO in S230), or if driver intention to perform handling of the host vehicle is detected (YES in S260), the ECU 20 may perform the ACC process according to the legacy ACC target acceleration (S280).

As is apparent from the above description, an adaptive cruise control (ACC) system and method based on peripheral situations of a vehicle can control ACC target acceleration by recognizing an average speed in at least one peripheral lane, and can prevent unnecessary acceleration of the vehicle, such that a driver and passengers who ride in the vehicle do not feel a sense of incongruity or unpleasant feeling.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An adaptive cruise control (ACC) system comprising:
a peripheral environment detection sensor configured to detect a peripheral environment or situation of a host vehicle during an ACC process of the host vehicle; and
an electronic control unit (ECU) configured to autonomously perform acceleration limiting or deceleration control of the host vehicle according to an ACC target acceleration/deceleration amount suitable for the peripheral environment or situation detected by the peripheral environment detection sensor,
wherein the peripheral environment or situation comprises: a presence of peripheral vehicles within a predetermined distance in front and rear of the host vehicle in two lanes adjacent to a lane of the host vehicle, and an average speed of the peripheral vehicles within the predetermined distance in front and rear of the host vehicle in the two lanes adjacent to the lane of the host vehicle,
wherein the ECU is configured to perform the acceleration limiting or the decelerating control based on the average speed during the ACC, and as the average speed decreases, an ACC acceleration limited amount is controlled to increase,
wherein the peripheral environment or situation is traffic flow in peripheral lanes of the host vehicle,
wherein the ECU comprises:
a peripheral situation decision module configured to determine the peripheral situation detected by the peripheral environment detection sensor; and
a target acceleration/deceleration calculation module configured to calculate the ACC target acceleration/deceleration amount suitable for the determined peripheral situation,
wherein, if one or more peripheral vehicles present in the two lanes adjacent to the lane of the host vehicle within the predetermined distance in forward and backward directions of the host vehicle are detected, the peripheral situation decision module calculates the average speed of the detected peripheral vehicles present in the two lanes adjacent to the lane of the host vehicle within the predetermined distance in forward and backward directions of the host vehicle, and
wherein the target acceleration/deceleration calculation module is configured to:
if a legacy ACC target acceleration is higher than zero "0", calculate a limited acceleration ratio by multiplying the average speed of the peripheral vehicles by a weight;
calculate a last ACC target acceleration by multiplying the calculated limited acceleration ratio by the legacy ACC target acceleration; and
perform the ACC process according to the calculated last ACC target acceleration.

2. The ACC system according to claim 1, wherein:
if only one lane from among peripheral lanes of the host vehicle is made available, the peripheral situation decision module calculates the average speed of peripheral vehicles located in the available lane.

3. The ACC system according to claim 2, wherein:
if one or more peripheral vehicles present in the two lanes adjacent to the lane of the host vehicle within the predetermined distance in forward and backward directions of the host vehicle are not detected, if a legacy ACC target acceleration is not higher than zero "0", or if driver intention to perform handling of the host vehicle is detected, the ECU performs the ACC process according to the legacy ACC target acceleration.

4. The ACC system according to claim 1, wherein:
if one or more peripheral vehicles present in the two lanes adjacent to the lane of the host vehicle within the predetermined distance in forward and backward directions of the host vehicle are not detected, if the legacy ACC target acceleration is not higher than zero "0", or if driver intention to perform handling of the host vehicle is detected, the ECU performs the ACC process according to the legacy ACC target acceleration.

5. An adaptive cruise control (ACC) system comprising:
a peripheral environment detection sensor configured to detect a peripheral environment or situation of a host vehicle during an ACC process of the host vehicle; and
an electronic control unit (ECU) configured to autonomously perform acceleration limiting or deceleration control of the host vehicle according to an ACC target acceleration/deceleration amount suitable for the peripheral environment or situation detected by the peripheral environment detection sensor,
wherein the peripheral environment or situation comprises: a presence of peripheral vehicles within a predetermined distance in front and rear of the host vehicle in two lanes adjacent to a lane of the host vehicle, and an average speed of the peripheral vehicles within the predetermined distance in front and rear of the host vehicle in the two lanes adjacent to the lane of the host vehicle,
wherein the ECU is configured to perform the acceleration limiting or the decelerating control based on the average speed during the ACC, and as the average speed decreases, an ACC acceleration limited amount is controlled to increase,
wherein the peripheral environment or situation is traffic flow in peripheral lanes of the host vehicle,
wherein the ECU comprises:
a peripheral situation decision module configured to determine the peripheral situation detected by the peripheral environment detection sensor; and
a target acceleration/deceleration calculation module configured to calculate the ACC target acceleration/deceleration amount suitable for the determined peripheral situation,
wherein, if one or more peripheral vehicles present in the two lanes adjacent to the lane of the host vehicle within the predetermined distance in forward and backward directions of the host vehicle are detected, the peripheral situation decision module calculates the average speed of the detected peripheral vehicles present in the two lanes adjacent to the lane of the host vehicle within the predetermined distance in forward and backward directions of the host vehicle, and
wherein the target acceleration/deceleration calculation module is configured to:
if the average speed of the peripheral vehicles is equal to or less than a legacy ACC target speed by a predetermined speed, calculate a last ACC target speed by limiting an ACC target speed to a sum of the average speed of the peripheral vehicles and the predetermined speed; and
perform the ACC process according to the calculated last ACC target speed.

6. The ACC system according to claim 5, wherein:
if one or more peripheral vehicles present in the two lanes adjacent to the lane of the host vehicle within the predetermined distance in forward and backward directions of the host vehicle are not detected, if a legacy ACC target acceleration is not higher than zero "0", or if driver intention to perform handling of the host vehicle is detected, the ECU performs the ACC process according to the legacy ACC target acceleration.

7. An adaptive cruise control (ACC) method comprising:
detecting a peripheral environment or situation of a host vehicle during an ACC process of the host vehicle;
calculating an ACC target acceleration/deceleration amount suitable for the detected peripheral environment or situation; and
autonomously performing acceleration limiting or deceleration control of the host vehicle according to the calculated ACC target acceleration/deceleration amount,
wherein the peripheral environment or situation comprises: a presence of peripheral vehicles within a predetermined distance in front and rear of the host vehicle in two lanes adjacent to a lane of the host vehicle, and average speed of the peripheral vehicles within the predetermined distance in front and rear of the host vehicle in the two lanes adjacent to the lane of the host vehicle,
wherein the acceleration limiting or decelerating control is performed based on the average speed during the ACC, and as the average speed decreases, an ACC acceleration limited amount is controlled to increase,
wherein the peripheral environment or situation is traffic flow in peripheral lanes of the host vehicle, and
wherein the method further comprises:
in the detecting the peripheral environment or situation of the host vehicle, if one or more peripheral vehicles present in the two lances adjacent to the lane of the host vehicle within the predetermined distance in forward and backward directions of the host vehicle are detected, calculating the average speed of the peripheral vehicles present in the two lances adjacent to the lane of the host vehicle within the predetermined distance in forward and backward directions of the host vehicle;
determining whether a target acceleration calculated in a legacy ACC process is higher than zero "0";
if a legacy ACC target acceleration is higher than zero "0", calculating a limited acceleration ratio by multiplying the average speed of the peripheral vehicles by a parameter "K";
calculating a last ACC target acceleration by multiplying the calculated limited acceleration ratio by the legacy ACC target acceleration; and
perform the ACC process according to the calculated last ACC target acceleration.

8. The ACC method according to claim 7, wherein the calculating the average speed of the peripheral vehicles includes:
if only one lane from among peripheral lanes of the host vehicle is made available, calculating the average speed of peripheral vehicles located in the available lane.

9. The ACC method according to claim 8, further comprising:
if one or more peripheral vehicles present in the two lanes adjacent to the lane of the host vehicle within the predetermined distance in forward and backward directions of the host vehicle are not detected, if the legacy ACC target acceleration is not higher than zero "0", or if driver intention to perform handling of the host vehicle is detected, performing the ACC process according to the legacy ACC target acceleration.

10. The ACC method according to claim 7, further comprising:
if one or more peripheral vehicles present in the two lanes adjacent to the lane of the host vehicle within the predetermined distance in forward and backward directions of the host vehicle are not detected, if the legacy ACC target acceleration is not higher than zero "0", or if driver intention to perform handling of the host vehicle is detected, performing the ACC process according to the legacy ACC target acceleration.

11. An adaptive cruise control (ACC) method comprising:
detecting a peripheral environment or situation of a host vehicle during an ACC process of the host vehicle;
calculating an ACC target acceleration/deceleration amount suitable for the detected peripheral environment or situation; and
autonomously performing acceleration limiting or deceleration control of the host vehicle according to the calculated ACC target acceleration/deceleration amount,
wherein the peripheral environment or situation comprises: a presence of peripheral vehicles within a predetermined distance in front and rear of the host vehicle in two lanes adjacent to a lane of the host vehicle, and average speed of the peripheral vehicles within the predetermined distance in front and rear of the host vehicle in the two lanes adjacent to the lane of the host vehicle,
wherein the acceleration limiting or decelerating control is performed based on the average speed during the ACC, and as the average speed decreases, an ACC acceleration limited amount is controlled to increase,
wherein the peripheral environment or situation is traffic flow in peripheral lanes of the host vehicle, and
wherein the method further comprises:
in the detecting the peripheral environment or situation of the host vehicle, if one or more peripheral vehicles present in the two lances adjacent to the lane of the host vehicle within the predetermined distance in forward and backward directions of the host vehicle are detected, calculating the average speed of the peripheral vehicles present in the two lances adjacent to the lane of the host vehicle within the predetermined distance in forward and backward directions of the host vehicle;
if the average speed of the peripheral vehicles is equal to or less than a legacy ACC target speed by a predetermined speed, calculating a last ACC target speed by limiting an ACC target speed to a sum of the average speed of the peripheral vehicles and the predetermined speed; and
perform the ACC process according to the calculated last ACC acceleration.

12. The ACC method according to claim 11, further comprising:
if one or more peripheral vehicles present in the two lanes adjacent to the lane of the host vehicle within the predetermined distance in forward and backward directions of the host vehicle are not detected, if a legacy ACC target acceleration is not higher than zero "0", or if driver intention to perform handling of the host vehicle is detected, performing the ACC process according to the legacy ACC target acceleration.

* * * * *